United States Patent
Lu

(10) Patent No.: US 12,130,479 B2
(45) Date of Patent: Oct. 29, 2024

(54) WINDOWLESS FERRULE

(71) Applicant: CommScope Technologies LLC, Hickory, NC (US)

(72) Inventor: Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 241 days.

(21) Appl. No.: 17/752,629

(22) Filed: May 24, 2022

(65) Prior Publication Data

US 2022/0381998 A1 Dec. 1, 2022

Related U.S. Application Data

(60) Provisional application No. 63/192,757, filed on May 25, 2021.

(51) Int. Cl.
*G02B 6/40* (2006.01)
*G02B 6/38* (2006.01)

(52) U.S. Cl.
CPC ........... *G02B 6/403* (2013.01); *G02B 6/3854* (2013.01); *G02B 6/3861* (2013.01)

(58) Field of Classification Search
CPC ..... G02B 6/403; G02B 6/3854; G02B 6/3861
See application file for complete search history.

(56) References Cited

U.S. PATENT DOCUMENTS

| 5,214,730 A | 5/1993 | Nagasawa et al. |
| 6,085,003 A | 7/2000 | Knight |
| 8,684,611 B2 | 4/2014 | Childers et al. |

FOREIGN PATENT DOCUMENTS

| WO | 2020/046711 | 3/2020 |
| WO | WO-2021065224 A1 * | 4/2021 |

* cited by examiner

*Primary Examiner* — Sung H Pak
*Assistant Examiner* — Hoang Q Tran
(74) *Attorney, Agent, or Firm* — Merchant & Gould P.C.

(57) ABSTRACT

A windowless multi-fiber ferrule including a ferrule body. The ferrule body includes a plurality of outer slots. The ferrule body defines an inner passage that extends through a length of the ferrule body from a front end to a rear end. The inner passage includes a main chamber and a row of parallel fiber bores. The ferrule body includes a first and a second major side which each define a plurality of slots. The ferrule body includes ferrule walls which are located between the main chamber and the major sides. The ferrule walls have a first thickness at the outer slots and a second thickness at the regions between the outer slots which is thicker than the first thickness. The main chamber includes sink locations adjacent the regions between the outer slots.

29 Claims, 5 Drawing Sheets

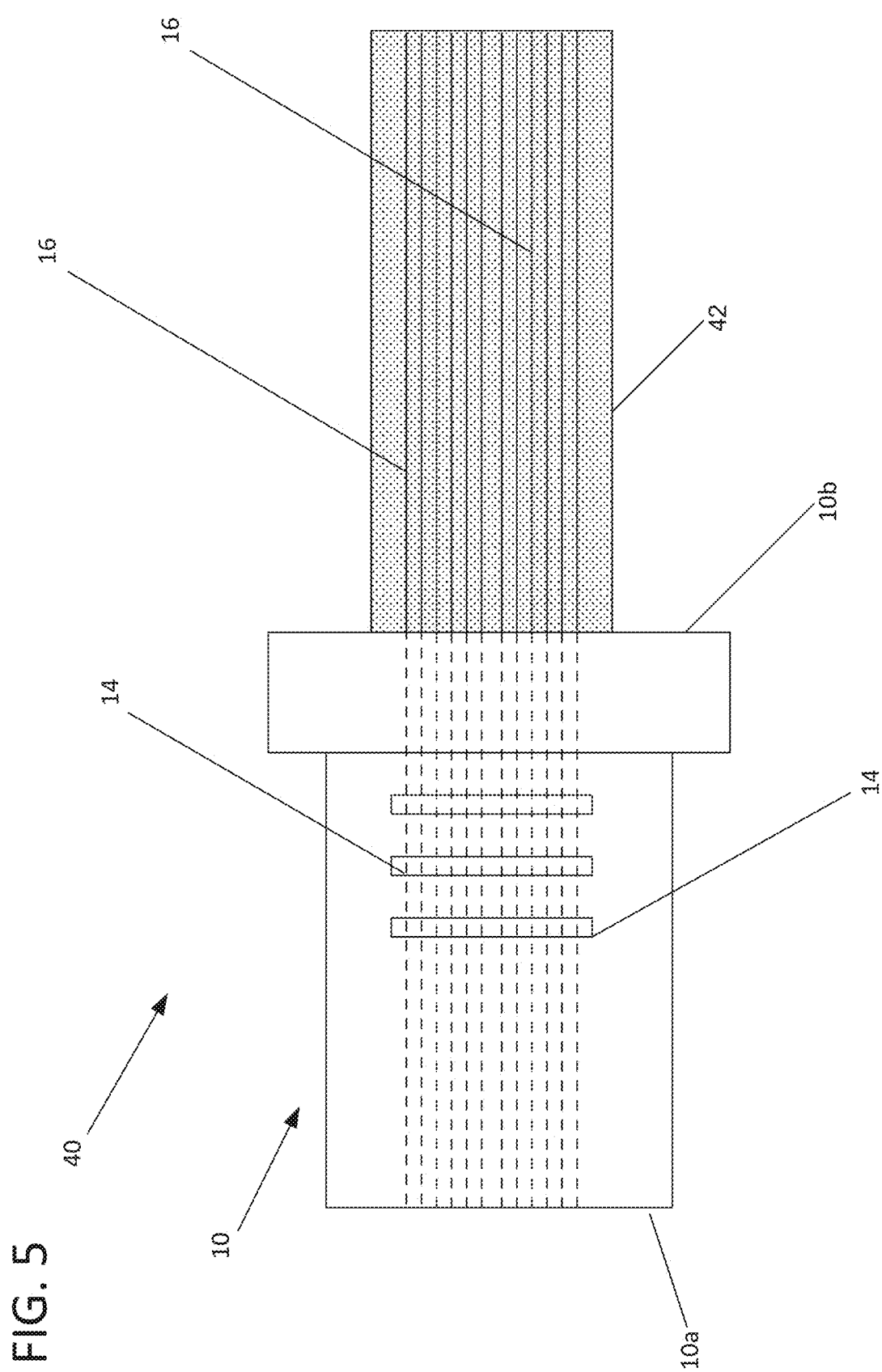

WINDOWLESS FERRULE

CROSS REFERENCE TO RELATED APPLICATION

This application claims the benefit of provisional application Ser. No. 63/192,757, filed May 25, 2021, which is incorporated herein by reference in its entirety.

TECHNICAL FIELD

The present disclosure relates generally to ferrules for supporting optical fibers within fiber optic connectors. More particularly, the present disclosure relates to a window-less multi-fiber ferrule.

BACKGROUND

A multi-fiber fiber optic connector, for example an MPO connector, typically includes a connector housing supporting a multi-fiber ferrule at a distal end and a connector boot at a proximal end. Example multi-fiber fiber optic connectors are disclosed by U.S. Pat. Nos. 5,214,730; 6,085,003 and 8,684,611.

A conventional multi-fiber fiber optic connector includes a connector housing, a multi-fiber ferrule such as an MT ferrule mounted upon end portions of a plurality of optical fibers, a spring and a spring push. Typically, the multi-fiber ferrule is positioned within a lengthwise extending passageway defined by the connector housing. The optical fibers are often incorporated as part of a ribbon that is routed into the ferrule. Within the ferrule, the fibers are separated and routed to individual fiber holes of the ferrule. The fibers are secured within the ferrule by epoxy. Conventionally, the ribbon passes through a ferrule boot mounted at the back end of the ferrule which prevents epoxy from leaking out the back end of the ferrule during injection of the epoxy into the ferrule for fiber securement. A window is often provided at a major side of the ferrule for facilitating viewing of optical fibers as the optical fibers are inserted into the ferrule during assembly and for facilitating injection of epoxy into the ferrule for fiber retention. PCT International Publication Number WO 2020/046711 discloses a ferrule assembly including such a window.

SUMMARY

Ferrules such as multi-termination ferrules (e.g., MPO ferrules) are often made of plastic material such as glass-filled polyphenylene sulfide having low-adhesion surface properties that make it difficult to provide effective bonding with adhesive such as epoxy. In multi-termination ferrules, adhesive such as epoxy is used to secure optical fibers within the ferrules. Aspects of the present disclosure relate to molded ferrule designs configured to promote mechanical interlocking between the ferrules and the adhesive used to secure optical fibers within the ferrules. In one example, the ferrules are windowless multi-fiber ferrules such as windowless MPO ferrules. In one example, ferrules are designed with non-uniform wall thicknesses configured to generate undercut features within interior fiber passages of the ferrules during injection molding of the ferrules. In one example, the undercut features can include sink locations formed during cooling of injection molded ferrule bodies. In one example, contiguous volumes of adhesive are bonded to the optical fibers within the ferrules, and the contiguous volumes of adhesive includes portions that interlock with the undercut features to prevent the fibers and the volumes of adhesive from being removed from the ferrules in axial directions that extend along lengths of the optical fibers. In one example, the non-uniform wall thicknesses cause sink locations within the interior fiber passages of the ferrules as part of the injection molding process due to variation in material shrinkage when cooling.

One aspect of the present disclosure relates to a method for making ferrules by an injection molding process in which sink locations are intentionally caused within the ferrules to provide undercut locations at locations within the ferrules that assist in retaining adhesive and optical fibers bonded to the adhesive within the ferrules. In one example, the ferrules are windowless multi-fiber ferrules. In one example, the sink locations are caused by variations in shrinkage during cooling of the injected material that forms the ferrules. In one example, the material has a composition that includes polyphenylene sulfide. In one example, the different wall thicknesses within a given ferrule can be selected to enhance shrinkage variations within the material of the ferrule during ferrule cooling as part of the injection molding process. The shrinkage variations can be suitable for generating sink locations within the interior of the ferrule that are suitable for assisting in retaining a contiguous volume of adhesive within the ferrule after curing of the adhesive. In certain examples, the contiguous volume of adhesive can include portions that interlock with the sink locations to prevent the contiguous volume of adhesive from being axially pulled from the ferrule in a direction that extends along the optical fibers bonded within the ferrule.

In one example, when an injection molded ferrule in accordance with the present disclosure begins to cool, the molded ferrule starts to cool from outside to inside such that shrinkage caused by the temperature reduction of the outer portion of the ferrule material pulls the material toward the outside of the ferrule. By providing the ferrule with a non-uniform material wall thickness, a thicker wall section has more material volume pulling toward the outside of the ferrule than a thinner wall section adjacent to the thicker wall section causing a sink location (e.g., a recess) to be formed within the interior of the ferrule. The sink location is in alignment with the thicker wall section and provides a recessed region with respect to the adjacent to the thinner wall section that undergoes less shrinkage than the thicker wall section.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 5 is a plan view of the multi-fiber ferrule of FIG. 3.

DETAILED DESCRIPTION

Figure 1:
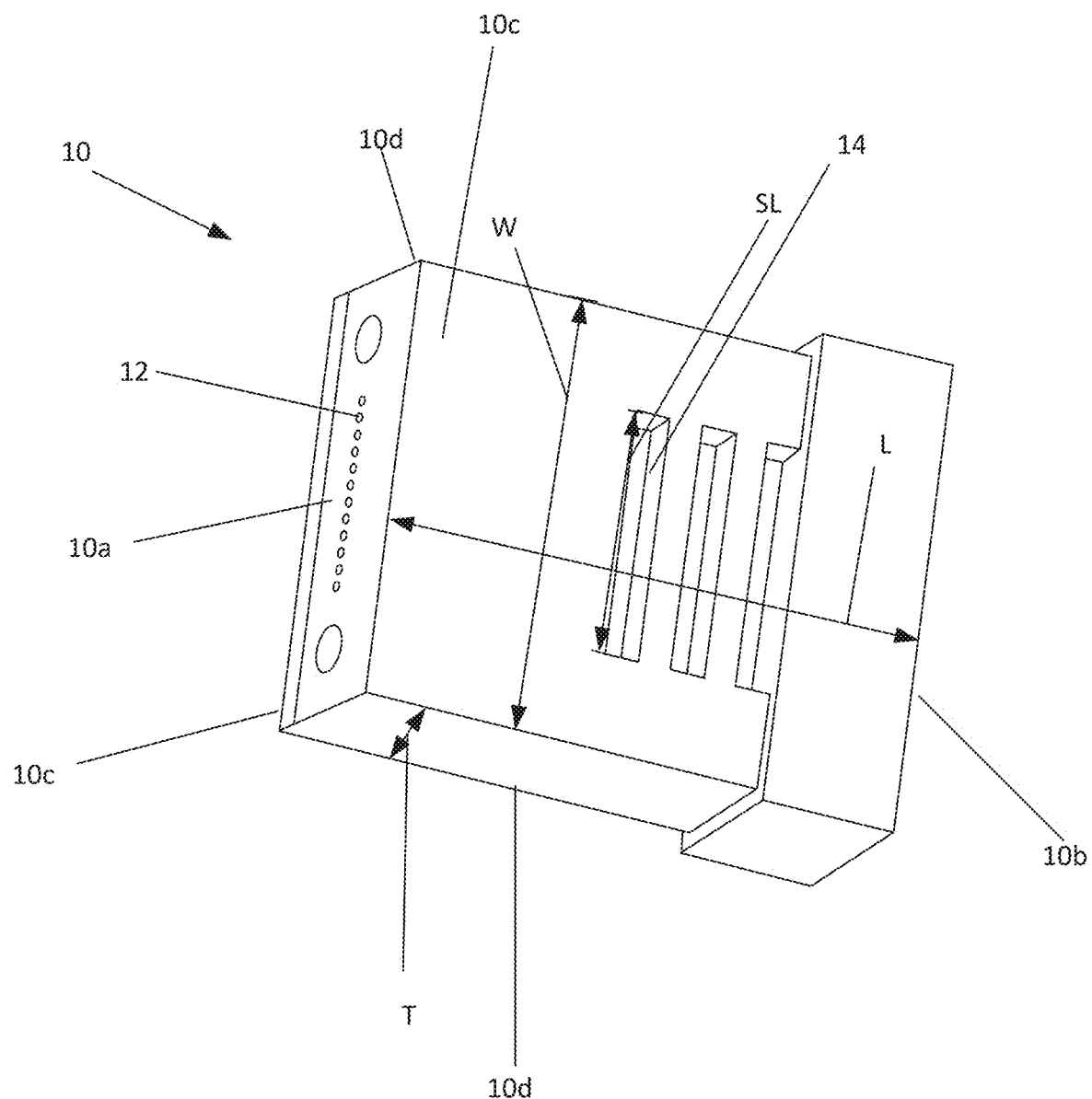
FIG. 1 is an isometric view of an example multi-fiber ferrule body in accordance with the principles of this disclosure.
Figure 2:
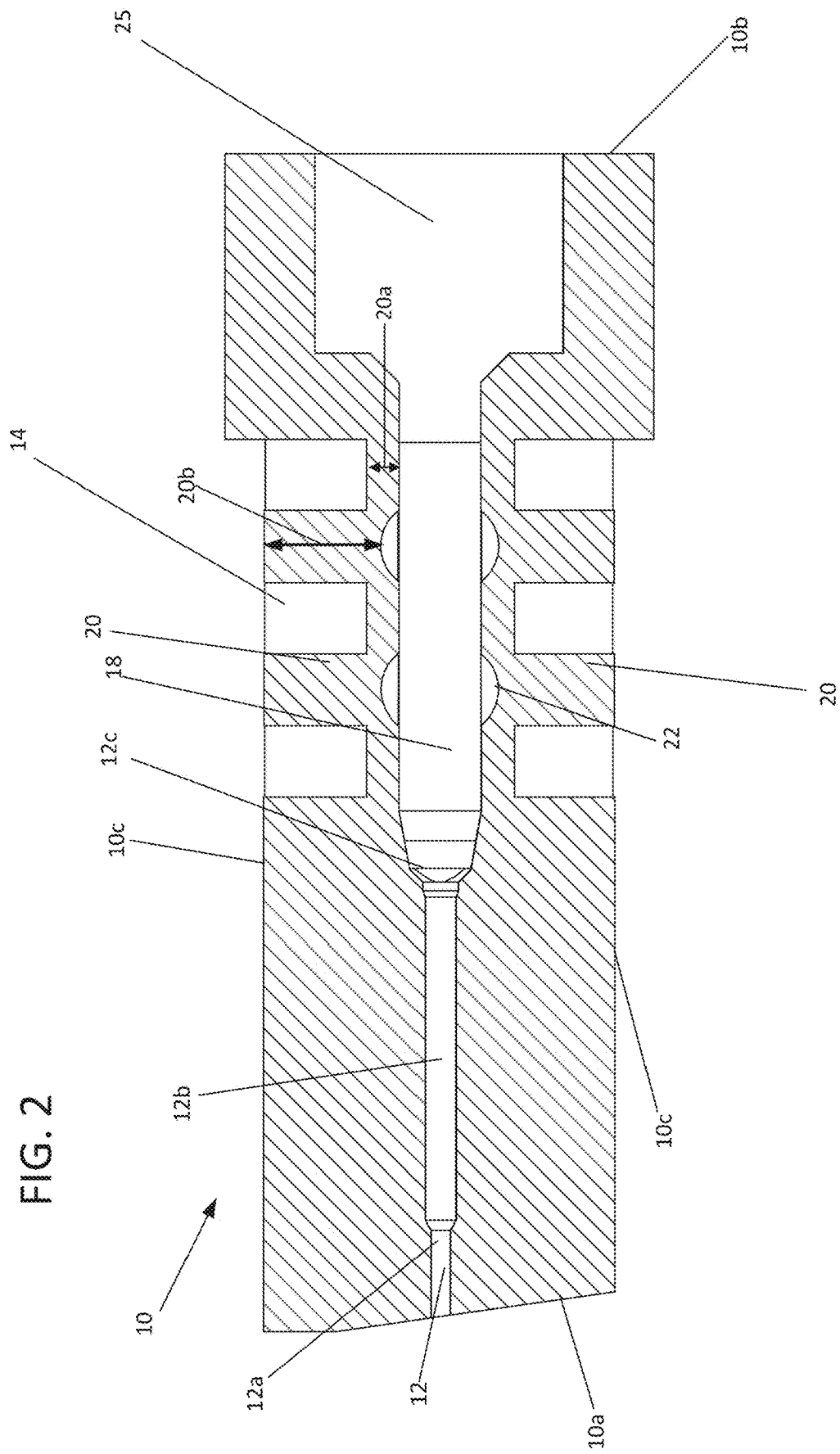
FIG. 2 is a cross-sectional view of the multi-fiber ferrule body of FIG. 1.

As discussed in the background, multi-fiber optical connectors generally include multi-fiber ferrules. Multi-fiber ferrules include ferrule bodies and optical fibers which extend through the ferrule bodies. An example ferrule body 10 is shown is shown in FIGS. 1 and 2. The ferrule body 10 has a length L extending between a front end 10a and a rear end 10b. The ferrule body 10 is rectangular in profile and includes a width W extending between minor sides 10d and a thickness T extending between major sides 10c. The major sides 10c define a plurality of outer slots 14 having slot lengths SL that extend across a portion of the width W of the ferrule body 10. The ferrule body 10 defines one or more parallel rows of fiber bores 12 for receiving optical fibers 16 (see FIG. 5). The ferrule body 10 is windowless on both major sides 10c.

As can be seen in FIG. 2, an interior of the ferrule body 10 includes a main chamber 18. The parallel rows of fiber bores 12 extend from the main chamber 18 to the front end 10a of the ferrule body 10. The ferrule body 10 includes ferrule walls 20 that are located between the main chamber 18 and the major sides 10c. The ferrule walls 20 have first wall portions with a first thickness 20a at the outer slots 14 and second wall portions with a second thickness 20b between the outer slots 14. The first thickness 20a and second thickness 20b are different from one another. The second wall portions are positioned between the first wall portions and are thicker than the first wall portions. The first thickness 20a is reduced as compared to the second thickness 20b by the presence of the outer slots 14. In this particular embodiment, the outer slots 14 are parallel with one another, however, other configurations are possible.

Figure 3:
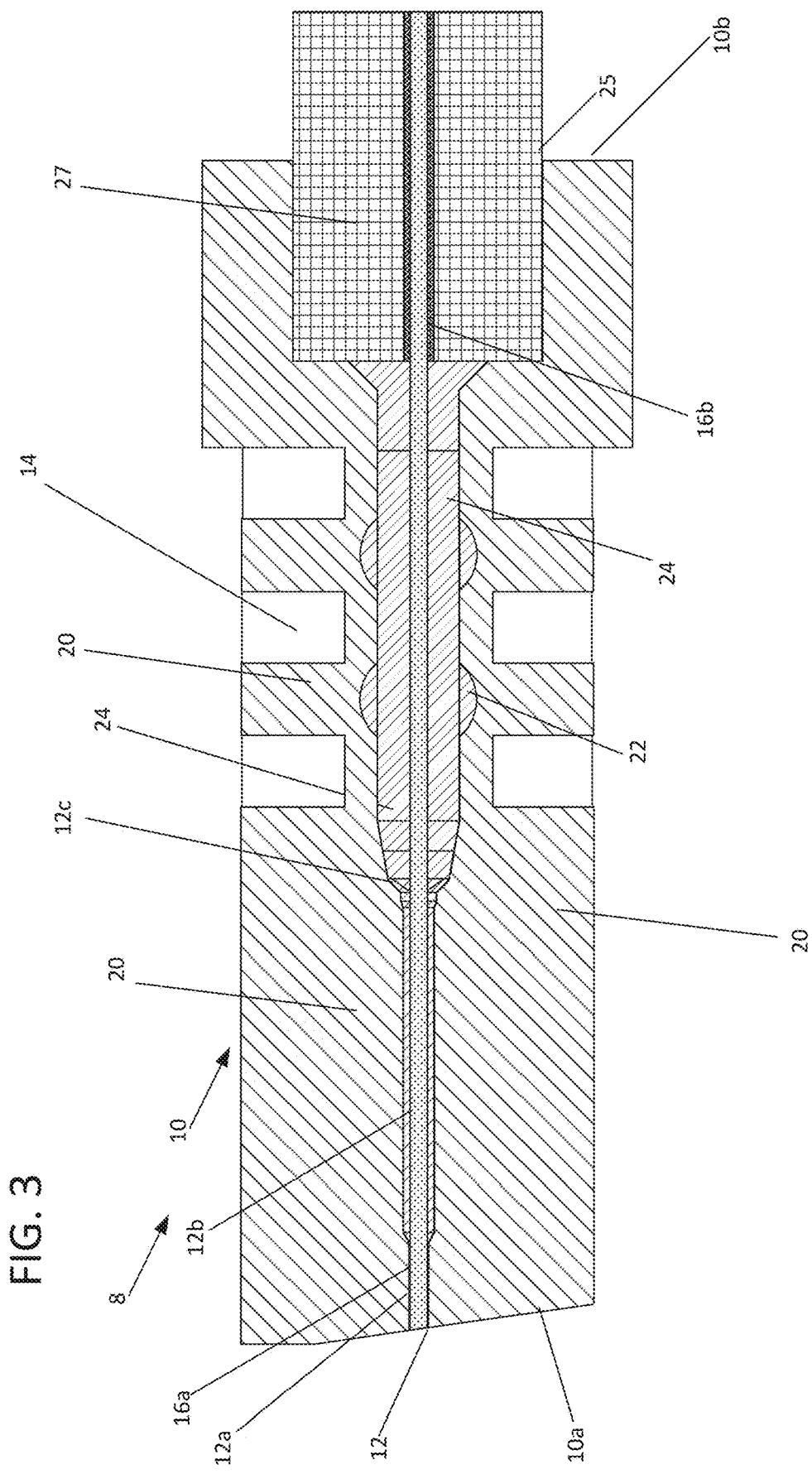
FIG. 3 is a cross-sectional view of a multi-fiber ferrule in accordance with the principles of this disclosure showing optical fibers and adhesive within the interior of the depicted ferule body.

The main chamber 18 additionally includes sink locations 22. The sink locations 22 are adjacent to the regions between the outer slots 14 (i.e., the second wall portions having the second thickness 20b). Referring to FIG. 3, a multi-fiber ferrule 8 is shown. The multi-fiber ferrule 8 includes optical fibers 16 which are shown extending through the fiber bores 12. The optical fibers 16 extend lengthwise through the ferrule body 10 and are bonded within the fiber bores 12 with a cured adhesive 24 (e.g., epoxy). The adhesive 24 is injected as a contiguous volume of adhesive within the ferrule about the optical fibers 16. As discussed above, the ferrule body 10 is typically made from an injection molded plastic with low surface adhesion properties such as an injection molded plastic including polyphenylene sulfide or a glass filled polyphenylene sulfide. The use of these materials makes bonding the optical fiber 16 within the fiber bores 12 difficult. To improve adhesive retention, the cured adhesive 24 extends into the sink locations 22 which creates mechanical interlocking thereby enhancing the retention of the optical fibers 16 and the volume of adhesive within the ferrule body 10. The ferrule body 10 additionally includes a boot-receiving portion 25 which extends from the rear end 10b to the main chamber 18 and is sized to fit a ferrule boot 27 through which the optical fibers 16 extend. When the adhesive is injected into the interior of the ferrule, the ferrule boot 27 prevents the adhesive from leaking out the rear end 10b of the ferrule body 10.

The fiber bores 12 have first portions 12a which are adjacent to the front end 10a of the ferrule body 10 and second portions 12b between the first portions 12a and the main chamber 18. The first portions 12a have a smaller diameter then the second portions 12b. The first portions 12a are sized to precisely receive bare fiber portions 16a of the optical fibers 16 which typically have a diameter of about 125 microns. The second portions 12b are sized for accommodating adhesive in the bores along with the optical fibers. In one example, the bare fiber portions 16a extend through at least a majority of the length of the ferrule. The fiber bores 12 additionally include chamfered regions 12c adjacent to the main chamber 18 for guiding the optical fibers 16 into the fiber bores 12 when the optical fibers 16 are inserted into the inner passage of the ferrule body 10 in a rear to front direction (e.g., from the rear end 10b to the front end 10a).

Figure 4:
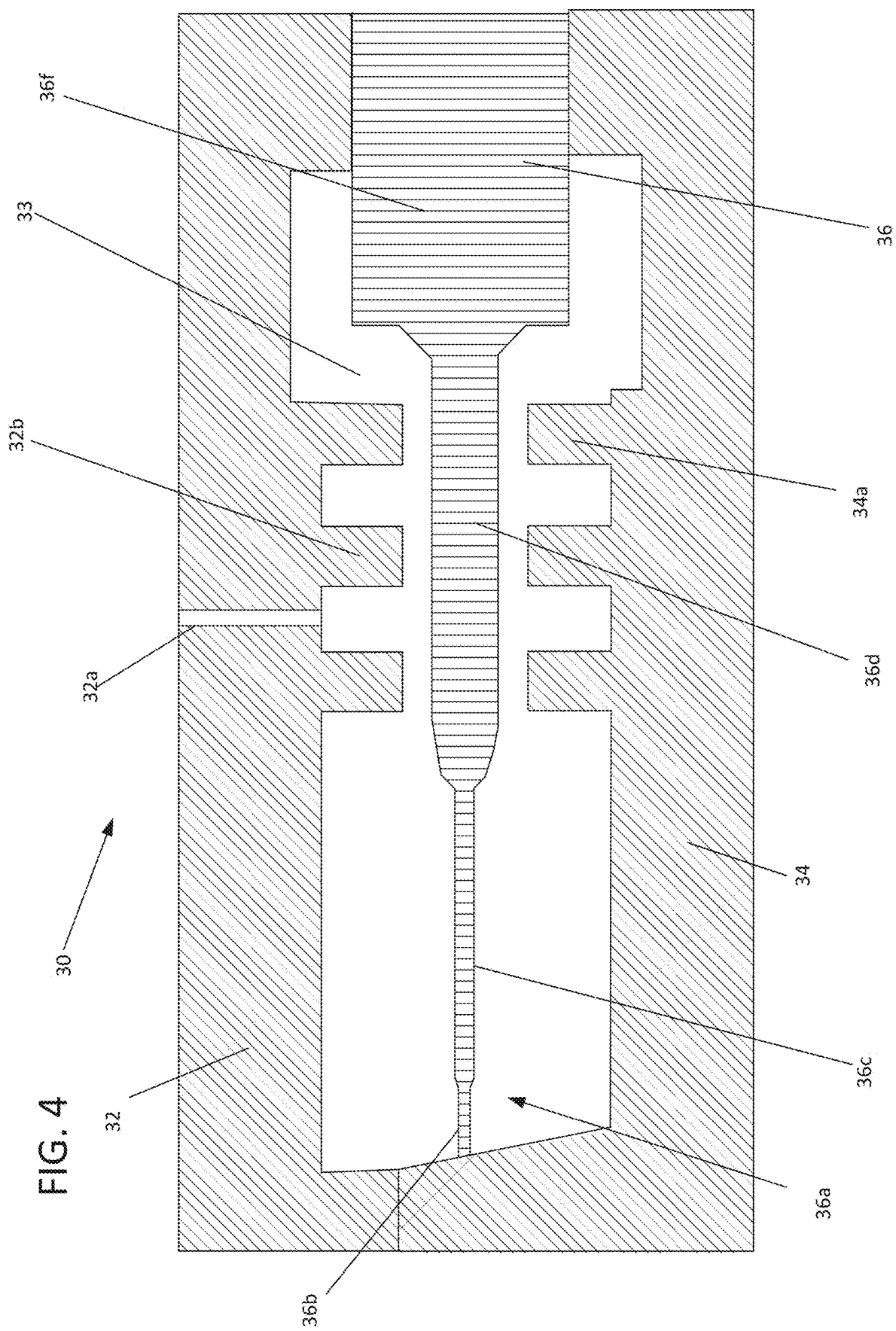
FIG. 4 is a cross-sectional view of a mold for manufacturing the multi-fiber ferrule body of FIG. 1.

As discussed above, the ferrule body 10 is manufactured through injection molding. In this regard, a mold 30 in accordance with the principles of this disclosure is shown at FIG. 4. The mold 30 includes a first mold piece 32, a second mold piece 34 and a mold core 36. During molding, the mold core 36 is placed into a cavity 33 between the first mold piece 32 and the second mold piece 34. The mold 30 is then closed and plastic, such as glass-filled polyphenylene sulfide, is injected into the mold cavity through one or more injection ports 32a. The cavity 33 is the negative image of the ferrule body 10 and the mold core 36 matches the shape of the desired interior of the ferrule, except for the sink locations 22. The plastic is then cooled at least partially within the mold 30. Coated fiber portions 16b (e.g., bare fiber coated with a polymeric coating such as acrylate typically at a diameter of about 200 microns or 250 microns) or ribbbonized portions of the optical fibers can be located behind the ferrule and in certain examples can extend into the ferrule boot and partially through the ferrule.

The mold core 36 includes pin portions 36a for defining the fiber bores 12 of the ferrule body 10. The pin portions 36a include a first portion 36b and a second portion 36c which define the first and second portions 12a, 12b of the fiber bores 12 respectively after the injection molding process has been completed. The core additionally includes a main portion 36d and an end portion 36f The main portion 36d defines the main chamber 18 and the end portion 36f will define the boot receiving portion 25 at the rear end 10b of the ferrule body 10.

The first and second mold pieces 32, 34 each include inner positive ribs 32b, 34a which define the outer slots 14 at the major sides 10c of the ferrule body 10 during molding. During the cooling of the plastic, there is a variation in shrinkage of the plastic due to the different wall thicknesses 20a, 20b which causes the sink locations 22 within the main chamber 18 of the ferrule body 10.

As the plastic is cooled or after the plastic is cooled, the mold core 36 is removed and the ferrule body 10 is removed from the mold 30. The mold core 36 can be removed before or after the ferrule body 10 is removed from the mold 30. Cooling can begin while the ferrule body 10 is in the mold 30 and continue after the ferrule body 10 is removed from the mold 30 and the core is removed from the ferrule body 10.

After the plastic of the ferrule body 10 is cooled and the sink locations 22 are created, the fibers 17 are inserted through the ferrule body and into the fiber bores 12. An adhesive (e.g., epoxy) is injected into the fiber passage through the rear end 10b of the ferrule body 10. The adhesive surrounds the optical fibers 16 and enters the sink locations 22 (see FIG. 3). Once the adhesive cures, the sink locations 22 provide a mechanical interlock between the volume of adhesive and the ferrule body 10 which secures the optical fibers 16 within the ferrule body 10 and resists withdrawal from the rear end 10b of the ferrule body 10.

FIG. 5 shows a plan view of the assembled multifiber ferrule 40. The assembled multifiber ferrule 40 includes the ferrule body 10 and shows optical fibers 16 extending from the rear end 10b of the ferrule body 10 to the front end 10a. The optical fibers 16 can be ribbonized with a polymeric matrix material 42 such as acrylate rearward of the ferrule body 10. The optical fibers 16 individually extend into the fiber bores 12 and can include bare fiber portions throughout the fiber bores 12 and the main chamber 18.

As disclosed herein a dimension is "about" a specified dimension if the dimension equals the specified dimension or is within normal manufacturing tolerances of the specified dimension.

From the forgoing detailed description, it will be evident that modifications and variations can be made in the devices of the disclosure without departing from the spirit or scope of the invention.

The invention claimed is:

1. A multi-fiber ferrule comprising:
a ferrule body having a length, a width and a thickness, the length extending between a rear end and a front end of the ferrule body, the width extending between minor sides of the ferrule body, the thickness extending between major sides of the ferrule body that extend across the width and along the length of the ferrule body, the ferrule body defining an inner passage arrangement that extends through the length of the ferrule body from the rear end to the front end, the inner passage including a main chamber and at least one row of parallel fiber bores that extend from the main chamber to the front end of the ferrule body, the major sides of the ferrule body defining a plurality of outer slots having slot lengths that extend across at least a portion the width of the ferrule body, the ferrule body including ferrule walls located between the main chamber and the major sides, the ferrule walls having a first wall thickness at the outer slots and a second wall thickness at regions between the outer slots, the second wall thickness being thicker than the first wall thickness, and the main chamber including sink locations adjacent the regions between the outer slots.

2. The multi-fiber ferrule of claim 1, wherein optical fibers extend lengthwise through the ferrule body, wherein the optical fibers are bonded within the fiber bores and the main chamber by a cured adhesive, and wherein the cured adhesive extends into the sink locations to mechanically interlock the cured adhesive with the ferrule body to enhance retention of the cured adhesive within the inner passage of the ferrule.

3. The multi-fiber ferrule of claim 2, wherein the ferrule bores have first portions adjacent the front end of the ferrule body and second portions located between the first portions and the main chamber, the first portions having a smaller diameter than the second portions.

4. The multi-fiber ferrule of claim 3, wherein the first portions are sized for precisely receiving bare fiber portions of the optical fibers.

5. The multi-fiber ferrule of claim 4, wherein the bare fiber portions have a diameter of about 125 microns.

6. The multi-fiber ferrule of claim 3, wherein the ferrule bores include chamfered regions adjacent the main chamber for guiding the optical fibers into the fiber bores when the optical fibers are inserted into the inner passage of the ferrule in a rear to front direction.

7. The multi-fiber ferrule of claim 1, wherein the slots are parallel.

8. The multi-fiber ferrule of claim 1, wherein the ferrule body is constructed of a material that includes injection molded plastic.

9. The multi-fiber ferrule of claim 8, wherein the injection molded plastic includes polyphenylene sulfide.

10. The multi-fiber ferrule of claim 8, wherein injection molded plastic includes glass-filled polyphenylene sulfide.

11. The multi-fiber ferrule of claim 1, wherein the ferrule body does not define any windows into the main chamber through the major sides of the ferrule body.

12. A multi-fiber ferrule comprising:
a ferrule body having a molded plastic construction, the ferrule body having a length, a width and a thickness, the length extending between a rear end and a front end of the ferrule body, the width extending between minor sides of the ferrule body, the thickness extending between major sides of the ferrule body that extend across the width and along the length of the ferrule body, the ferrule body defining an inner passage arrangement that extends through the length of the ferrule body from the rear end to the front end, the inner passage including a main chamber and at least one row of parallel fiber bores that extend from the main chamber to the front end of the ferrule body, the ferrule body having different wall thicknesses at the main chamber caused by one or more recesses in an exterior of the ferrule body, the different wall thicknesses being configured to provide at least one sink location within the main chamber when cooling during molding of the ferrule body.

13. The multi-fiber ferrule of claim 12, wherein optical fibers extend lengthwise through the ferrule body, wherein the optical fibers are bonded within the fiber bores and the main chamber by a cured adhesive, and wherein the cured adhesive extends into the sink marks to mechanically interlock the cured adhesive with the ferrule body to enhance retention of the cured adhesive within the inner passage of the ferrule.

14. The multi-fiber ferrule of claim 13, wherein the ferrule bores have first portions adjacent the front end of the ferrule body and second portions located between the first portions and the main chamber, the first portions having a smaller diameter than the second portions.

15. The multi-fiber ferrule of claim 14, wherein the first portions are sized for precisely receiving bare fiber portions of the optical fibers.

16. The multi-fiber ferrule of claim 15, wherein the bare fiber portions have a diameter of about 125 microns.

17. The multi-fiber ferrule of claim 15, wherein the ferrule bores include chamfered regions adjacent the main chamber for guiding the optical fibers into the fiber bores when the optical fibers are inserted into the inner passage of the ferrule in a rear to front direction.

18. The multi-fiber ferrule of claim 12, wherein the ferrule body includes wall portions defining the different thicknesses, and wherein the thicknesses extend from the main chamber to at least one of the major sides of the ferrule body.

19. The multi-fiber ferrule of claim 18, wherein the wall portions include at least one thicker wall portion positioned between two thinner wall portions.

20. The multi-fiber ferrule of claim 19, wherein a first set of wall portions including the at least one thicker wall portion positioned between two thinner wall portions is provided between the main chamber and the first major side, and wherein a second set of wall portions including the at least one thicker wall portion positioned between two thinner wall portions is provided between the main chamber and the second major side.

21. The multi-fiber ferrule of claim 20, wherein the thinner wall portions correspond to outer slots defined at the first and second major sides, wherein the outer slots have lengths that extend across the width of the ferrule body.

22. The multi-fiber ferrule of claim 12, wherein the ferrule body is constructed of a material that includes injection molded plastic.

23. The multi-fiber ferrule of claim 22, wherein the injection molded plastic includes polyphenylene sulfide.

24. The multi-fiber ferrule of claim 22, wherein injection molded plastic includes glass-filled polyphenylene sulfide.

25. The multi-fiber ferrule of claim 12, wherein the ferrule body does not define any windows into the main chamber through the major sides of the ferrule body.

26. A method for manufacturing the ferrule body of claim 1 comprising:
   placing a core insert into a cavity of a two-piece mold, the core insert including pin portions for defining the fiber bores of the fiber passage arrangement and a main core body for defining the main chamber of the fiber passage arrangement, the mold including inner positive ribs for defining the outer slots at the major sides of the ferrule body;
   closing the mold and injecting a plastic into the cavity of the mold around the core insert; and
   cooling the plastic within the mold wherein variation in shrinkage of the plastic during cooling due to the different wall thicknesses causes the sink locations within the main chamber of the ferrule body.

27. The method of claim 26, further comprising removing the core insert from the rear end of the ferrule body.

28. The method of claim 27, further comprising removing the ferrule body from the mold.

29. The method of claim 27, further comprising injecting adhesive into the fiber passage arrangement through the rear end of the ferrule after the core insert has been removed, inserting the optical fibers into the fiber passage arrangement after injection of the adhesive, occupying the sink locations with a portion of the adhesive, and curing the adhesive wherein after curing the portion of the adhesive within the sink locations provides a mechanical interlock between the adhesive and the ferrule body that resists withdrawal of the adhesive from the ferrule body through the rear end of the ferrule body.

* * * * *